C. W. CONNER.
TORIC TOOL FORMING MACHINE.
APPLICATION FILED APR. 29, 1912.

1,121,326.

Patented Dec. 15, 1914.

WITNESSES:
E. A. Mayo
O. M. McLaughlin

INVENTOR.
Charles W. Conner.
BY
V. H. Lockwood
ATTORNEY.

UNITED STATES PATENT OFFICE.

CHARLES W. CONNER, OF INDIANAPOLIS, INDIANA, ASSIGNOR TO THE ONEPIECE BIFOCAL LENS COMPANY, OF INDIANAPOLIS, INDIANA, A CORPORATION.

TORIC TOOL-FORMING MACHINE.

1,121,326.

Specification of Letters Patent.

Patented Dec. 15, 1914.

Application filed April 29, 1912. Serial No. 693,839.

*To all whom it may concern:*

Be it known that I, CHARLES W. CONNER, of Indianapolis, county of Marion, and State of Indiana, have invented a certain useful Toric Tool-Forming Machine; and I do hereby declare that the following is a full, clear, and exact description thereof, reference being had to the accompanying drawings.

The object of this invention is to provide a suitable attachment for use upon a lathe or similar machine by means of which it would be possible to produce work having a concave surface of compound curvature.

The invention is particularly adapted for use in optical work for the manufacture of lens holders. In the manufacture of toric lenses it is the practice after the convex side of the lens has been ground and finished, to cement the lens into a holder having a mating concavity for the purpose of holding it while the other side of the lens is being ground and polished.

The feature of the invention lies in pivotally mounting the cutting tool and causing it to swivel about the center as the work is revolved.

The nature of the invention will be understood from the accompanying drawings and the following description and claims.

Figures 1, 3:
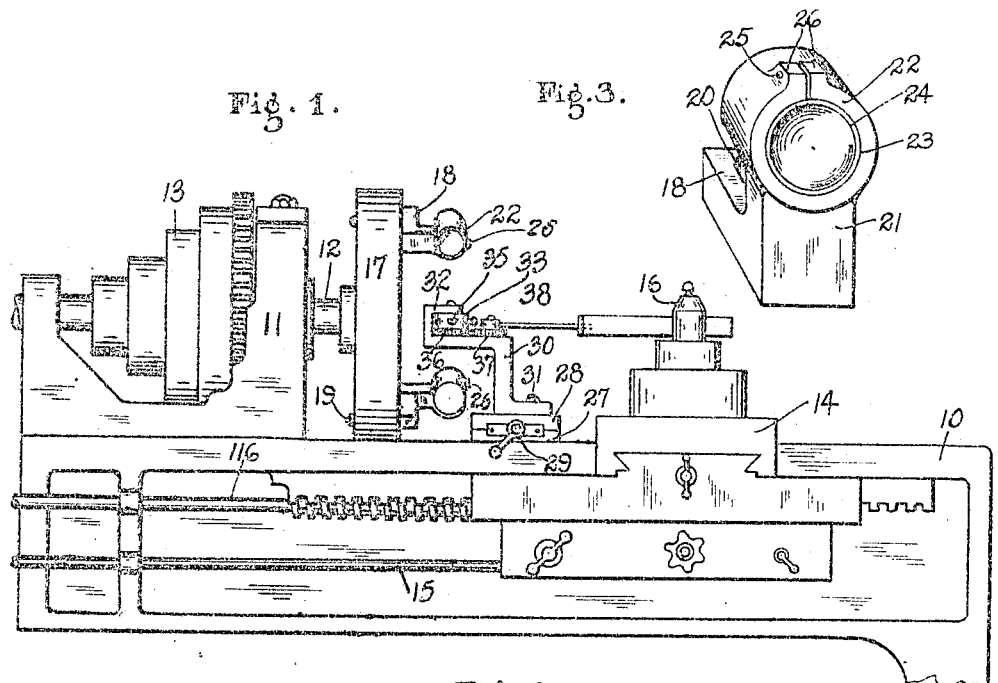
Figure 2:
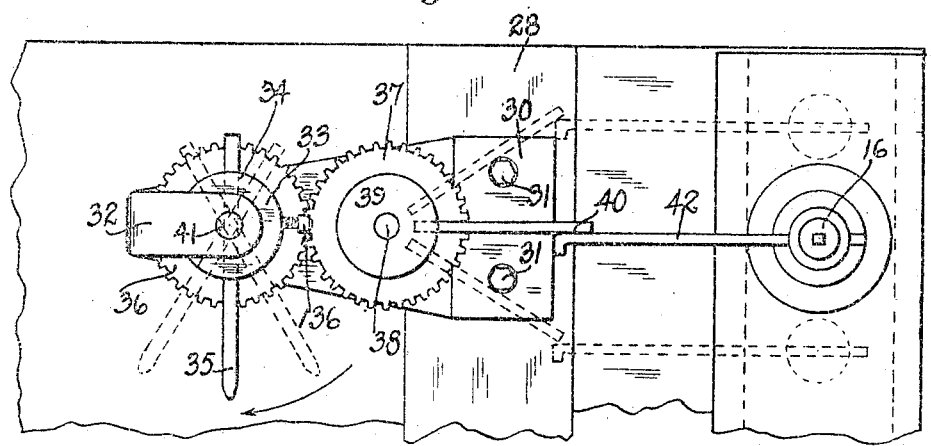
Figure 4:
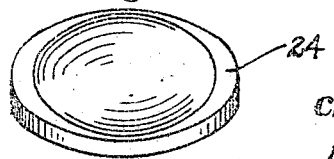

In the drawings, Figure 1 is a side elevation of a portion of a lathe with my invention installed thereon. Fig. 2 is a plan view on a larger scale of a portion of the same. Fig. 3 is a perspective view of the lens holder chuck with a lens holder held therein. Fig. 4 is a perspective view of a finished lens holder.

In detail, there is shown in the drawings a lathe having a frame or bed 10, upon which there is secured a head 11 carrying a driven shaft 12 with pulleys 13 thereon, to which the power is applied from the usual countershaft, not shown. There is a carriage 14 slidably mounted on the frame 10 and having the usual feed rods 15 and 116 for giving said carriage longitudinal and transverse movement relative to the frame.

A tool post 16 is also secured to the movable member of the carriage 14 in the usual manner. Secured upon the right-hand end of the driven shaft 12 there is a face plate 17, upon which the chucks 18 are secured by the bolts 19.

The chucks 18, as shown in Fig. 3, have a body portion with a slot 20, through which the bolts 19 extend and an upwardly projecting stem 21 upon which a split sleeve 22 is mounted, and in one end of said split sleeve there is a cylindrical opening 23 into which the lens holder 24 is fitted and secured therein by tightening the screw 25, which draws together the lip portions 26 of the split sleeve and clamps the lens holder in place. Two such chuck holders are shown concentrically mounted upon the face plate 17 with the lens holder 24 upon the inner or central side.

A plate 27 is secured upon the bed 10 and extends transversely of the lathe, and upon this plate a carriage 28 is mounted and may be given transverse motion of the bed by means of the well known screw feed operated by the crank 29. A substantially Z-shaped frame 30 is secured to the carriage 28 by the bolts 31, and upon the upper left-hand face of said frame and guided by an upward extension 32, a tool post 33 is pivotally mounted.

The tool post 33 has a slot 34 cut through it, through which the shank of the tool 35 extends and is held in place by means of the set screw 136. A gear 36 is secured to the underside of the tool post 33 and concentric therewith and meshes with a gear 37 pivoted on the pin 38 in the upper face of the Z-bar 30, and there is a boss 39 upon the upper side of said gear 37, from which a lever 40 extends, and by moving said lever the tool 35 may be caused to turn or oscillate about its pivot pin 41. A bar 42 is secured in the tool post 16 and extending longitudinally of the lathe, and will engage the lever 40 after the carriage 14 is fed across the bed, and thus the oscillation of the tool may be caused by the carriage cross feed.

The operation of my invention is as follows: Lens-holders 24, which have been formed or blanked into disks upon any desired machine, are secured within the opening 23 in the split sleeve 22 of the chucks 18, and they are mounted in their desired relation upon the face plate 17. The tool 35 being properly set, power is applied to the lathe, and the face plate is revolved, and by causing the carriage 14 to travel from the front to the rear side of the bed, the tool 35 may be caused to travel from the left-hand to the right-hand dotted-line position shown in Fig. 2, and in doing so will form a depression in the inner faces of the lens holders 24 which depression will have the desired double curvature, making use of the principle that the revolution of a circle or a portion of a circle about its diameter will generate a portion of a spherical surface.

It will be readily understood that by varying the length of the lever 40 and the bar 42, or by moving the carriage 14 longitudinally of the bed toward or away from the face plate 17, the speed of this oscillation may be varied. It will also be understood that the distance of the tool 35 from the center of its pivot pin 41 may be varied for varying the degree of curvature upon the finished product.

I claim as my invention:

1. A toric tool forming machine including a pivoted tool, means for holding the work arranged so that said work holder will revolve about the pivotal center of said tool, and means for giving said tool oscillatory movement across the plane of revolution of the work holder.

2. A toric tool forming machine including a pivoted tool, a rotatable face plate at one side of the tool, a plurality of means extending from said face plate for holding work so that the work will revolve about the pivotal center of said tool, and means for giving the tool movement across the plane of revolution of the work holders.

3. A toric tool forming machine including a rotatable face plate, means extending therefrom for holding work, a tool pivoted concentric with the series of work holders, and means for giving the tool movement across the plane of revolution of said work holder.

4. A toric tool forming machine including a rotatable face plate, a plurality of means extending therefrom for holding work, a tool pivoted concentric with the series of work holders, and means for giving the tool oscillatory movement across the plane of revolution of the work holders.

5. A toric tool forming machine including a pivoted tool, means for holding the work which means is revoluble in the plane in which said tool pivot lies, means for giving said tool movement across the plane of revolution of the work holder, and means for adjusting the pivot of the tool along the plane of revolution of the work holder to bring the tool into and out of engagement with the work.

6. The combination with a lathe or the like having a driven shaft, a bed having a carriage movably mounted thereon, a face plate driven from said shaft, and means for securing work thereon, of a tool pivotally mounted in connection with said frame, means for adjusting said tool into or out of engagement with the work, and adjustable means operated by the travel of said carriage for oscillating said tool.

7. A toric tool forming machine including a tool, a gear for actuating said tool, another gear for operating said tool gear, an arm extending from the latter gear, and means movable transversely of and in engagement with said arm for actuating said gears.

8. A toric tool forming machine including a tool, a gear for actuating said tool, another gear for operating said tool gear, an arm extending from the latter gear, means movable transversely of said arm, and an arm projecting from said transversely moving means into engagement with the arm on the gear for actuating said arm and gears.

9. A toric tool forming machine including a tool, a gear for actuating said tool, another gear for operating said tool gear, an arm extending from the latter gear, means movable transversely of said arm, and an arm adjustably mounted in said transversely moving means and extending into engagement with the arm on the gear whereby the gears may be driven and by adjusting said last-mentioned arm the extent of movement of said gears may be varied.

In witness whereof, I have hereunto affixed my signature in the presence of the witnesses herein named.

CHARLES W. CONNER.

Witnesses:
G. H. BOINK,
O. M. McLAUGHLIN.